United States Patent [19]
Mori et al.

[11] Patent Number: 4,857,911
[45] Date of Patent: Aug. 15, 1989

[54] MULTIFUNCTIONAL PAGER RECEIVER CAPABLE OF REDUCING THE MEMBER OF MANUAL SWITCHES

[75] Inventors: Toshihiro Mori; Takashi Oda; Takashi Ohyagi, all of Tokyo, Japan

[73] Assignee: NEC Corporation, Tokyo, Japan

[21] Appl. No.: 170,592

[22] Filed: Mar. 18, 1988

Related U.S. Application Data

[63] Continuation of Ser. No. 77,053, Jul. 9, 1987, abandoned, which is a continuation of Ser. No. 655,287, Sep. 28, 1984, abandoned.

[30] Foreign Application Priority Data

| Sep. 30, 1983 | [JP] | Japan | 58-180385 |
| Sep. 30, 1983 | [JP] | Japan | 58-150665[U] |
| Sep. 30, 1983 | [JP] | Japan | 58-150666[U] |
| Sep. 30, 1983 | [JP] | Japan | 58-150667[U] |

[51] Int. Cl.$^4$ .............................................. H04Q 1/00
[52] U.S. Cl. ........................... 340/825.44; 340/825.47; 340/825.48
[58] Field of Search ........... 340/311.1, 825.44–825.48, 340/825.53; 455/36, 38; 368/10, 11, 66, 69, 70

[56] References Cited

U.S. PATENT DOCUMENTS

| 3,756,013 | 9/1973 | Bergey et al. | 368/241 |
| 3,937,004 | 2/1976 | Natori et al. | 368/11 |
| 3,976,995 | 8/1976 | Sebestyen | 340/825.44 X |
| 4,163,230 | 7/1979 | Konii | 368/11 |
| 4,197,526 | 8/1980 | Levine et al. | 340/825.44 X |
| 4,412,217 | 10/1983 | Willard et al. | 340/825.44 |
| 4,477,808 | 10/1984 | Ichikawa | 340/825.44 |
| 4,626,842 | 12/1986 | Ichikawa et al. | 340/825.44 |

*Primary Examiner*—Ulysses Weldon
*Attorney, Agent, or Firm*—Sughrue, Mion, Zinn, Macpeak & Seas

[57] ABSTRACT

In a multifunctional pager receiver comprising a processing circuit (30) operable in a plurality of modes of operations, each mode is selected by manual switches (51, 62–64) smaller in number than the modes. A combination of successive manual operations of the switches changes the modes from an intermediate one to a final one. At least one of the switches is operated plural times. An operation announcement is stored in a message processor (32) included in the processing circuit and displayed in the intermediate mode on a display unit (71) so as to specify the following modes to be selected. A plurality of message signals are stored in a random access memory included in the message processor. A part of each stored message is successively and rapidly displayed on the display unit. A decoder cooperates with the message processor in the processing circuit to detect a call number signal assigned to the pager receiver and delivers a sequence of clocks to the message processor.

6 Claims, 5 Drawing Sheets

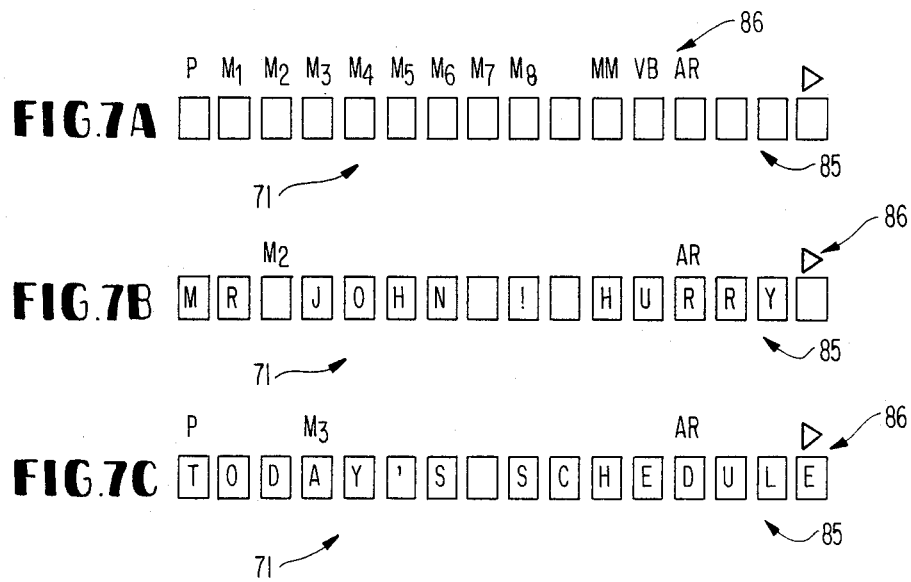
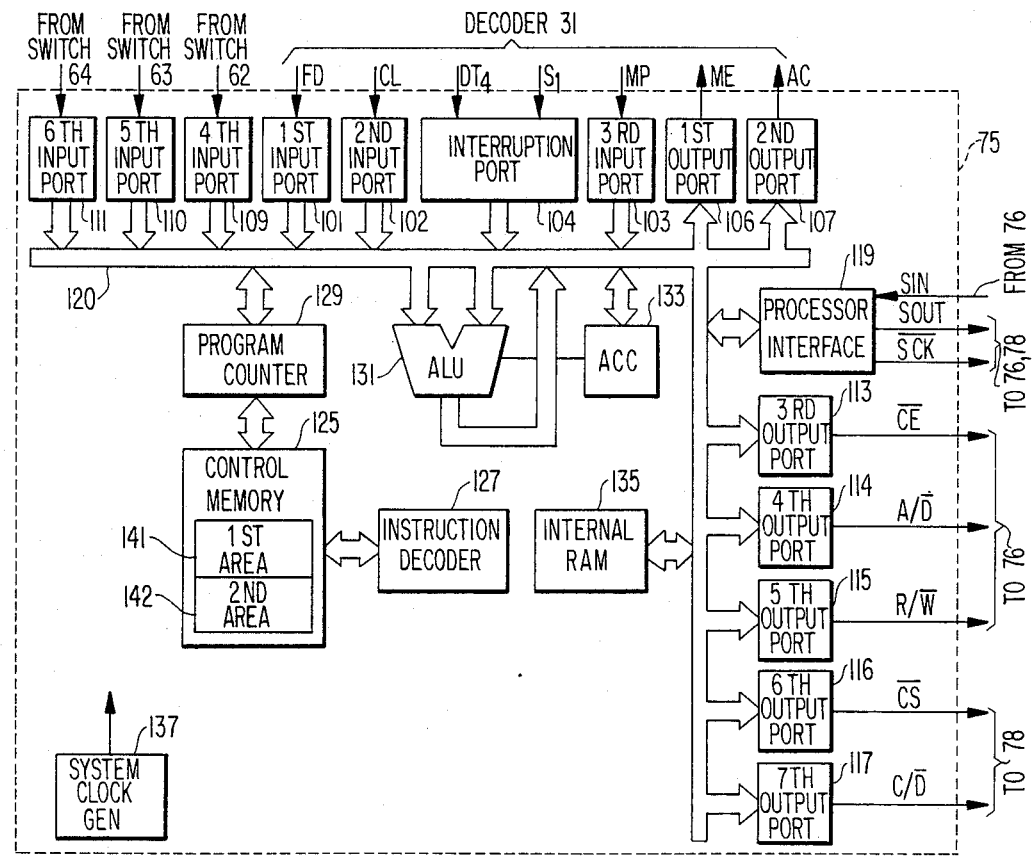

MULTIFUNCTIONAL PAGER RECEIVER CAPABLE OF REDUCING THE MEMBER OF MANUAL SWITCHES

This is a continuation of application Ser. No. 077,053 filed July 9, 1987 now abandoned which is a continuation of application Ser. No. 655,287 filed Sept. 28, 1984 now abandoned.

BACKGROUND OF THE INVENTION

This invention relates to a pager receiver which is capable of displaying each of messages on a display unit.

A recent technical development have brought about a multifunctional pager receiver which can provide not only an indication of a terminating call but also visual displays of messages on a display unit. A storage unit is installed in such a pager receiver so as to store the messages. A storage capacity of the memory unit tends to increase to satisfy a recent demand.

It is preferable that the messages stored in the storage unit are individually accessed by a possessor of the pager receiver in different manual modes to be either optionally displayed on the display unit or voluntarily erased from the storage unit. In addition, it is desired that an important one of the messages should repeatedly be displayed on the display unit with the important message preserved in the storage unit. Anyway, such a pager receiver should carry out operations in the different manual modes.

A conventional pager receiver of the type described comprises a plurality of manual switches for the different manual modes. With an increase of the manual switches, the pager receiver inevitably becomes bulky in size. Accordingly, portability of the pager receiver becomes worse with the increase of manual switches. Operation errors may occur frequently when the manual switches increase in number.

Furthermore, it becomes difficult to rapidly display a desired one of the messages on the display unit when the storage unit has an increased storage capacity as mentioned before.

SUMMARY OF THE INVENTION

It is an object of this invention to provide a pager receiver which is capable of avoiding operation errors in manual modes.

It is another object of this invention to provide a pager receiver of the type described, wherein various kinds of manual operations can be carried out without an increase of manual switches.

It is a further object of this invention to provide a pager receiver of the type described, wherein each message can rapidly be displayed on a display unit even when a storage unit of the receiver has a large storage capacity.

A pager receiver to which this invention is applicable comprises a display unit for displaying each message carried by message signals. The pager receiver comprises manually operable specifying means for specifying a plurality of manual modes, one after another at a time, to produce a mode signal indicative of each of the manual modes, and a memory unit for memorizing a plurality of announcement signals representative of operation announcements, respectively. The operation announcements correspond to the respective manual modes. Each of the operation announcements is indicative of at least one of the manual modes that should be specified following the manual mode indicated by the mode signal. The receiver further comprises accessing means coupled to the specifying means and to the display unit for accessing the memory unit in response to the mode signal to send one of the announcement signals to the display unit as an active signal and to make the display unit display the operation announcement represented by the active signal.

BRIEF DESCRIPTION OF THE DRAWING

FIGS. 7(A), (B), and (C), are views for use in describing operation of a display unit shown in FIG. 1;

FIG. 8 is a block diagram of a central processing unit used in the message processor shown in FIG. 5;

DESCRIPTION OF THE PREFERRED EMBODIMENTS

Figure 1:
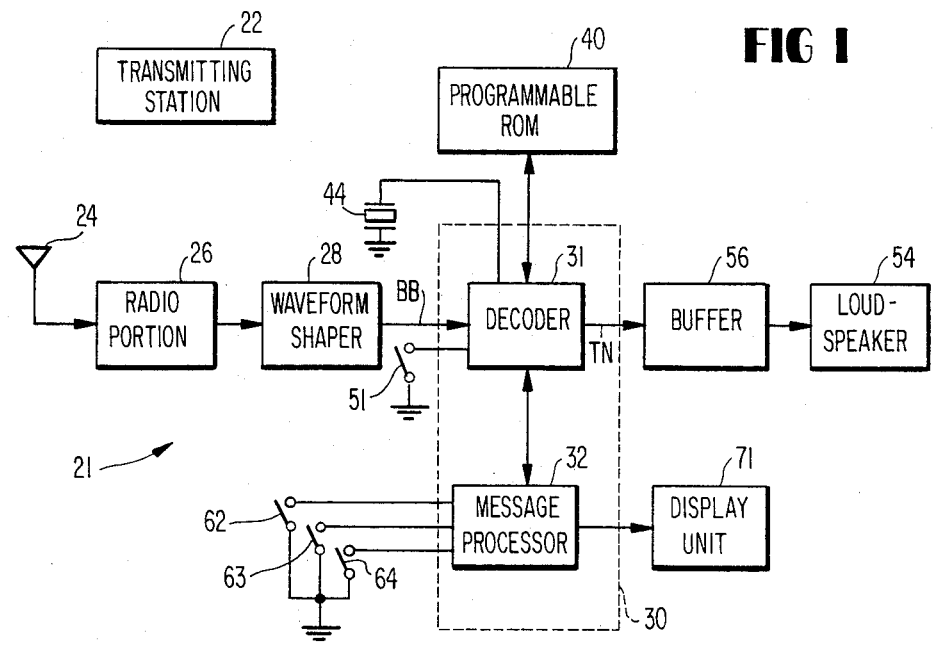
FIG. 1 is a block diagram of a pager receiver according to a preferred embodiment of this invention.
Figure 2:
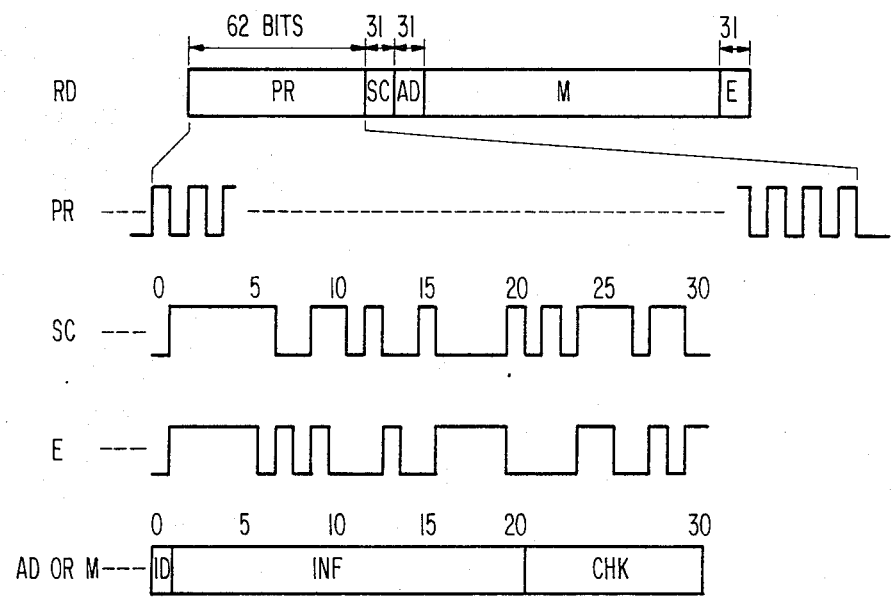
FIG. 2 is a time chart for use in describing a call signal received by the pager receiver illustrated in FIG. 1.

Referring to FIG. 1, a pager receiver 21 according to a preferred embodiment of this invention is operable in response to a radio call signal which is transmitted from a transmitting station 22. As illustrated in FIG. 2, the radio call signal RD comprises a preamble signal PR of 62 bits, a frame synchronization signal SC of 31 bits, a call number signal AD of 31 bits, a message signal M, and an end signal E of 31 bits, which are all successively arranged to form a frame, as depicted along a top line. The preamble signal PR is specified by a repetition of pulses equal in number to 62, as shown along a second line labelled PR. The frame synchronization signal SC has a fixed pattern of 31 bits, as illustrated along a third line labelled SC. Likewise, the end signal E has an additional fixed pattern of 31 bits different from the fixed pattern of the frame synchronization signal SC, as shown along a fourth line labelled E. Each of the frame synchronization signal SC and the end signal E is formed by a BCH (Bose-Chaudhuri-Hocquenghem) code of (31, 21) which is well known in the art.

In FIG. 2, the call number signal AD consists of the BCH code of (31, 21) like the frame synchronization signal SC and the end signal E. As depicted in a bottom line labelled AD or M, the call number signal AD comprises an identification area ID of a single bit, an information area INF of 20 bits, and a check bit area CHK of 10 bits. The call number signal AD is specified by a logic "0" level at the identification area ID and carries, in the information area INF, a call number which is assigned to each pager receiver. The message signal M is similar to the call number signal AD, as shown along the bottom line. More particularly, the message signal M consists of the BCH code of (31, 21) and is specified by a logic "1" level at the identification area ID. A message is located in the information area INF.

As will be understood from the top line of FIG. 2, a plurality of message signals may be arranged following the call number signal AD, although description will be made about a single message signal. Thus, each frame is variable in length depending on the number of the message signals. Let the message signal M have a bit rate different from that of the call number signal AD. It is assumed that the bit rates of the message and the call number signals M and AD are equal, for example, to 200 and 100 Hz, respectively.

In FIG. 1, the radio call signal is sent through an antenna 24 to a radio portion 26 to be subjected to amplification, frequency conversion, and the like in a well-known manner and to be converted into a baseband signal BB carrying the preamble signal PR, the frame synchronization signal SC, the call number signal AD, the message signal M, and the end signal E, which are all illustrated in FIG. 2. The baseband signal BB is supplied through a waveform shaper 28 to a processing circuit 30 as a succession of digital signals.

The processing circuit 30 comprises a decoder 31 for decoding the baseband signal BB into the preamble signal PR, the frame synchronization signal SC, the call number signal AD, and the end signal E. A message processor 32 is for processing the message signal M. Thus, the processing circuit 30 is divided into two parts, namely, the decoder 31 and the message processor 32.

Figure 3:
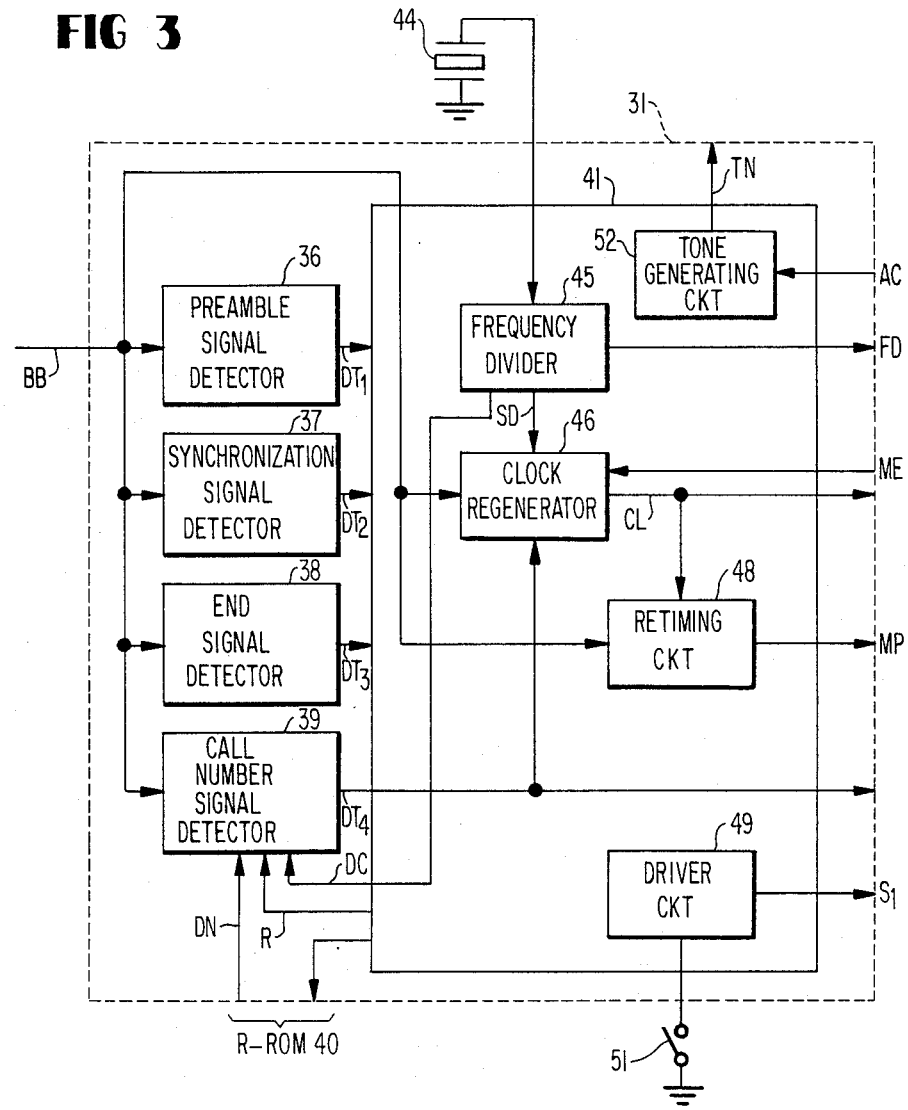
FIG. 3 is a lock diagram of a decoder for use in the pager receiver illustrated in FIG. 1.

Referring to FIG. 3 together with FIGS. 1 and 2, the decoder 31 comprises a preamble signal detector 36 for detecting the preamble signal PR to produce a first detection signal $DT_1$ representative of detection of the preamble signal PR. A synchronization signal detector 37 and an end signal detector 38 detect the frame synchronization signal SC and the end signal E to produce second and third detection signals $DT_2$ and $DT_3$ representative of detection of the frame synchronization signal SC and the end signal E, respectively. Each of the preamble signal detector 36, the synchronization signal detector 37, and the end signal detector 38 can be constituted by a combination of a shift register, Exclusive OR gates, and an AND gate, as described in U.S. Pat. No. 4,613,859 which is assigned to the assignee of the present invention.

Bit synchronization and frame synchronization are established with reference to the baseband signal BB and the frame synchronization signal SC in a bit synchronization circuit (not shown) and the synchronization signal detector 37, respectively.

A call number signal detector 39 detects the call number signal AD assigned to the pager receiver and produces a fourth detection signal $DT_4$ representative of detection of the call number signal AD.

Figure 4:
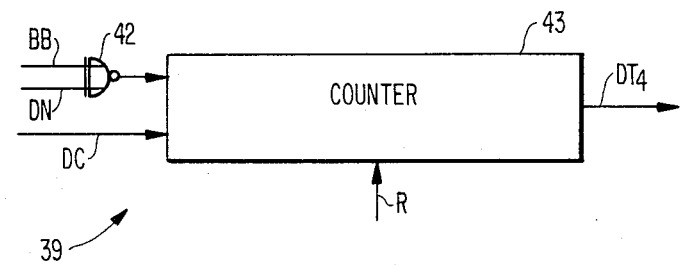
FIG. 4 is a block diagram of a part of the decoder shown in FIG. 3.

Temporarily referring to FIG. 4, the call number signal detector 39 cooperates with a programmable read-only memory (P-ROM) 40 (FIG. 1) so as to detect the call number signal AD. More specifically, the P-ROM 40 stores at least one directory number signal DN of 31 bits indicative of a directory number assigned to the pager receiver and is accessed by a decoder controller 41 (FIG. 3) after establishment of the frame synchronization in a known manner. The directory number signal DN is successively supplied from the P-ROM 40 bit by bit to an Exclusive NOR gate 42 (FIG. 4). The Exclusive NOR gate 42 compares the baseband signal BB with the directory number signal DN to produce a coincidence pulse on detection of coincidence between bits of the baseband and the directory number signals BB and DN. The coincidence pulse is sent to a counter 43 in synchronism with a sequence of decoder clocks DC having a frequency of, for example, 100 Hz. The decoder clock sequence DC is produced in a manner to presently be described. The counter 43 is reset by a reset signal R produced by the decoder controller 41 each time when the decoder clocks are counted to a count of thirty-one in the decoder controller 41.

Under the circumstances, the counter 43 is successively counted up in response to the coincidence pulse and produces the fourth detection signal $DT_4$ when the coincidence pulse is counted to a count of twenty-nine.

In FIG. 3, the decoder controller 41 is supplied with the baseband signal BB and the first through the fourth detection signals $DT_1$ to $DT_4$, together with a sequence of oscillation pulses from a crystal oscillation element 44. The oscillation pulse sequence may have a repetition frequency of, for example, 200 KHz or so. A frequency divider 45 frequency divides the oscillation pulse sequence into a first sequence of frequency divided pulses FD and a second sequence of frequency divided pulses SD. The decoder clock sequence DC is also produced by the frequency divider 45 and will be named first clocks. The first and the second frequency divided pulses FD and SD have frequencies of, for example, 2 KHz and 200 Hz, respectively, and are delivered to the message processor 32 (FIG. 1) and a clock regenerator 46, respectively.

Responsive to the baseband signal BB and the second frequency divided pulses SD, the clock regenerator 46 produces a sequence of regenerated clock pulses CL which is synchronized with the message signal in a manner to be described later. Anyway, the regenerated clock pulses CL are produced from the oscillation pulses and will be referred to as second clocks. The regenerated clock pulses CL are delivered to the message processor 32 and also to a retiming circuit 48 supplied with the baseband signal BB carrying the message signal M. The message signal M is retimed by the regenerated clock pulses in the retiming circuit 48 to be sent as a succession of message pulses MP to the message processor 32 in synchronism with the regenerated clock pulses CL.

In addition, the fourth detection signal $DT_4$ is supplied through the decoder controller 41 to the message processor 32 and will simply be called a detection signal.

The decoder controller 41 further comprises a driver circuit 49 connected to a first manual switch 51. Operation of the switch 51 will later be described in detail. For the time being, it may be mentioned that the driver circuit 49 supplies the message processor 32 with a first enable signal $S_1$ when the first manual switch 51 is closed by a possessor. A tone generating circuit 52 is controlled by the message processor 32 in a manner to be described and sends a tone signal TN to a loudspeaker 54 (FIG. 1) through a buffer circuit 56.

Although not shown in FIG. 3, the decoder controller 41 further comprises parts for producing the reset signal R and the like in a usual manner.

In FIG. 1, the message processor 32 is coupled to the decoder 31 and to second, third, and fourth manual switches 62, 63, and 64 for specifying the manual modes in response to manual operations of the second through fourth manual switches 62 to 64. Herein, it is assumed that second through fourth enable signals $S_2$, $S_3$, and $S_4$ are produced when the second through fourth manual switches 62 to 64 are manually closed, respectively.

The message processor 32 is put into operation in each manual mode in cooperation with a display unit 71. Briefly, the manual modes are for manually accessing each message signal stored in the message processor 32 so as to display a message carried by the accessed message signal on the display unit 71, to erase the accessed message signal, or to preserve the accessed message signal. Anyway, each message is displayed on the display unit 71 in the form of a succession of characters or letters. The succession is variable in length.

Figure 5:
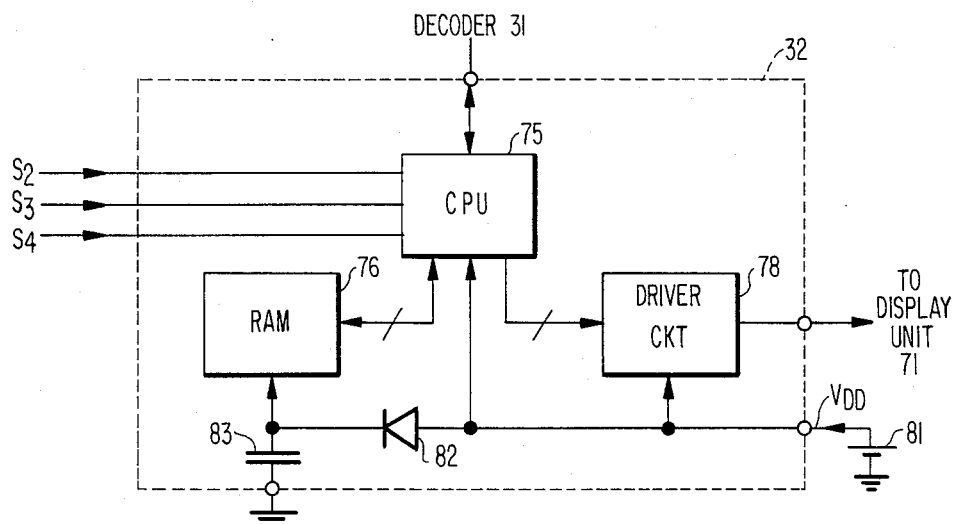
FIG. 5 is a block diagram of a message processor for use in the pager receiver illustrated in FIG. 1.

Referring to FIG. 5, the message processor 32 comprises a central processing unit (CPU) 75 which will be described later in detail in conjunction with FIG. 8, a random access memory (RAM) 76 storing each message signal, and a display driver circuit 78 for driving the driver unit 71 (FIG. 1). The remaining elements will be described in conjunction with FIG. 8. The random access memory 76 has a plurality of areas each of which is for storing a single one of the characters of each message and that each message occupies the areas determined by the length of the message. A total number of the areas is equal, for example, to 500. Messages stored in the random access memory 76 will be referred to as files or filed messages, respectively.

In addition, the files may successively be sent to an external device, such as a printer, a microcomputer, or the like, through a predetermined terminal (not shown) of the message processor 32 under control of the central processing unit 75.

Furthermore, the display unit 71 can display only a preselected number of characters which is equal, for example, to 16. When a message consists of characters greater in number than the preselected number, the display unit 71 can not display a whole of the message in question at any time. In this event, the characters of the message may cyclically be displayed on the display unit 71. Such a display operation will be named a scroll operation. The central processing unit 75 can carry out the scroll operation, as will become clear as the description proceeds.

In FIG. 5, the message controller 32 is supplied with a source voltage $V_{DD}$ from a battery 81. The battery 81 is to be exchanged to another one some day. During exchange of the battery 81, the files, namely, the filed messages may undesiredly be extinct from the random access memory 76. In order to avoid extinction of the filed messages, the illustrated message processor 32 comprises a diode 82 coupled to the battery 81 and a capacitor 83 connected to the diode 82 and the random access memory 76.

With this structure, the capacitance 83 is charged through the diode 82 by the battery 81 insofar as the battery 81 is not disconnected from the message processor 32. The filed messages are kept in the random access memory 76 by the source voltage $V_{DD}$ supplied from the battery 81. When supply of the source voltage $V_{DD}$ is interrupted by disconnection of the battery 81 from the message processor 32, an electric voltage is supplied from the capacitance 83 to the random access memory 72. As a result, the filed messages are kept in the random access memory 76 a prescribed duration which is dependent on a capacitance of the capacitor 83. Thus, the filed messages stored in the random access memory 76 are backed up by a combination of the diode 82 and the capacitor 83 which may be referred to as a backup circuit. In the example being illustrated, control signals which may be present in the central processing unit 75 are transferred from the central processing unit 75 to the random access memory 76 during disconnection of the battery 81 when a backup operation is indicated by the possessor.

Other operations may be possible by the illustrated message processor 32. At any rate, the above-mentioned operations can be specified by the manual modes.

It is to be noted here that the manual modes more than four can be specified by the four manual switches 51, 62, 63, and 64 (FIG. 1), as will presently become clear.

Figure 6:
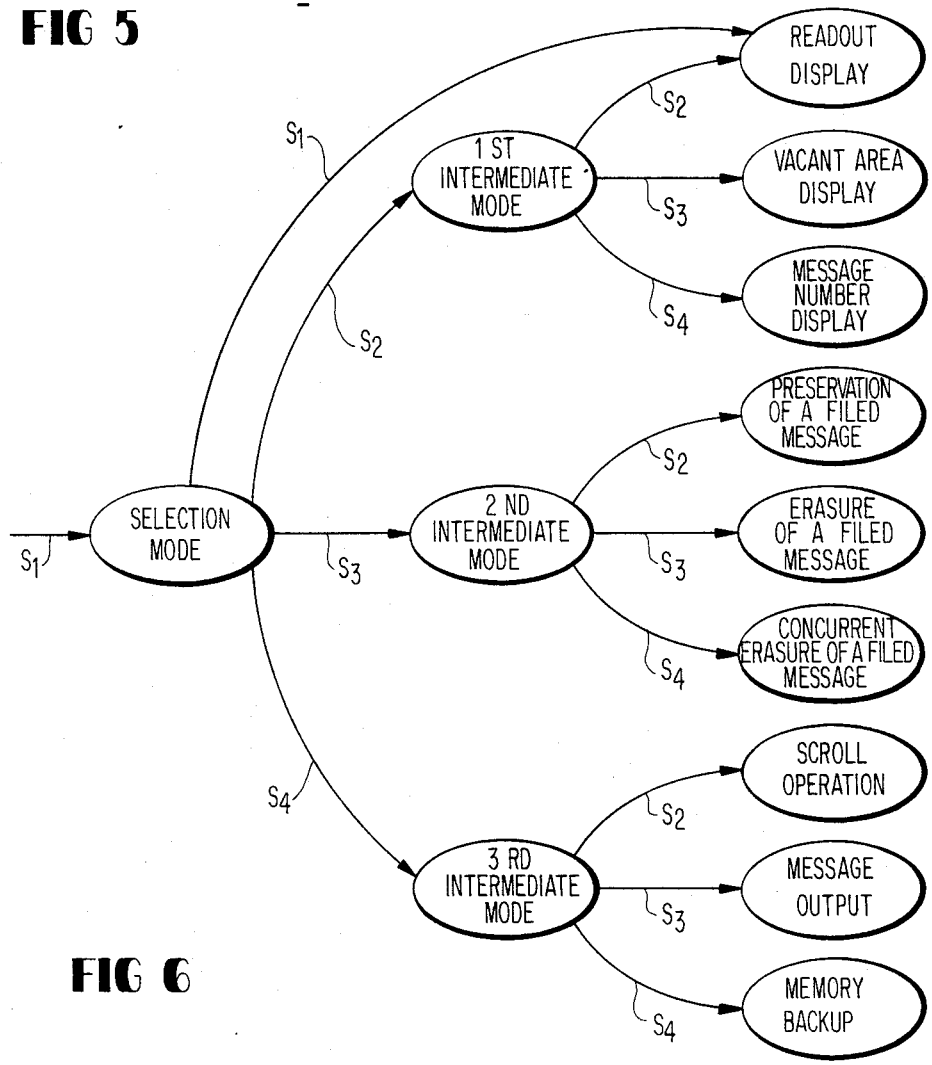
FIG. 6 is a view for use in describing operation of the pager receiver illustrated in FIG. 1.

Referring to FIG. 6, the manual modes are divided into intermediate modes and final modes which succeed the intermediate modes and which are shown at the rightmost column of this figure. As will readily be understood from FIG. 6, the intermediate modes are successively shifted to the final modes in accordance with the first through the fourth enable signals $S_1$ to $S_4$.

More particularly, the first enable signal $S_1$ is supplied through the decoder 31 to the message processor 32 by closure of the first manual switch 51. In the example being illustrated, the first manual switch 51 is also used to forcibly stop the tone signal TN in addition to production of the first enable signal $S_1$. Therefore, the first enable signal $S_1$ appears only when no tone signal TN is sent to the loudspeaker 54 (FIG. 1). Such common use of the first manual switch 51 results in a reduction of the number of manual switches, such as 51 and 62 to 64.

Responsive to the first enable signal $S_1$, the message processor 32 is put into a zeroth one of the intermediate modes that is for selecting the following modes and that may be therefore called a selection mode. In this event, the first enable signal $S_1$ may be named a first one of mode signals that specifies the selection mode.

The following modes are visually displayed on the display unit 71. Visual displays of the following modes serve to avoid operation errors of the possessor. To this end, the central processing unit 75 comprises a control memory (not shown) for memorizing a plurality of announcement signals which are representative of operation announcements corresponding to the respective manual modes, as will later be described. Each of the operation announcements is indicative of at least one of the manual modes that should be specified following the manual mode provided by the mode signal.

Responsive to the first mode signal, namely, the first enable signal $S_1$, the random access memory 76 produces the announcement signals for displaying a first one of the operation announcements corresponding to four of the manual modes. The first operation announcement indicates first, second, and third ones of the intermediate modes that provide visual displays related to a message display operation, a file access operation, and an action setting operation, respectively.

Specifically, the first operation announcement appears in the selection mode on the display unit 71 in the form of, for example, "$S_2$:D, $S_3$:FA, $S_4$:AS" where D, FA, and AS are indicative of the message display operation, the file access operation, and the action setting operation, respectively. The first operation announcement indicates that the message display operation (D), the file access operation (FA), and the action setting operation (AS) are carried out after the selection mode when the second through fourth enable signals $S_2$ to $S_4$ are produced by closure of the second through the fourth manual switches 62 to 64, respectively. Such an operation announcement lasts a predetermined duration of, for example, 5 seconds.

As shown in FIG. 6, the selection mode can be shifted to one of the final modes by production of the first enable signal $S_1$. The first operation announcement indicates only the three intermediate modes without the one final mode in consideration of the number of characters which can be displayed on the display unit 71. The above-mentioned one final mode which is selected by closure of the first manual switch 51 may be indicated by a specification for the pager receiver.

When either one of the second through fourth manual switches 62 to 64 is closed within the predetermined duration, the next following or a second one of the operation announcements appears on the display unit 71. In the example being illustrated, the second operation announcement indicates three of the final modes. The final modes and the corresponding operations are enumerated in Table 1. t,0180

Let the second manual switch 62 be closed to produce the second enable signal $S_2$ when the first operation announcement is displayed on the display unit 71. In this event, the selection mode is shifted to the first intermediate mode wherein the next following operation announcement appears on the display unit 71 as the second operation announcement in the form of, for example, "$S_2$:R, $S_3$:VA, $S_4$:MN" where R, VA, and MN are indicative of the readout display mode, the vacant area display mode, and the message number display mode, respectively. Recapitulating, the first intermediate mode is selected by a combination of the first and the second enable signals $S_1$ and $S_2$. Thus, such a combination specifies each manual mode and may therefore be called a second one of the mode signals.

Referring to FIG. 7, the display unit 71 comprises a liquid crystal display (LCD) member 85 which can display sixteen characters at one time, as mentioned before. The illustrated display unit 71 further comprises an indicator member 86 comprising a plurality of indicators which indicate symbols, such as P, $M_1$, $M_2$, ..., $M_8$, MM, VB, AR, and an arrow " ▷ ", when the indicators are illuminated or luminous.

In FIG. 7(A), the symbol P is illuminated in the preservation mode, as will presently become clear. The symbols $M_1$ through $M_8$ specifies the number of the filed messages. The luminous symbols $M_1$ through $M_8$ show the fact that eight messages are stored in the random access memory 76 (FIG. 5). The luminous symbols MM and VB are for distinguishing between the manual modes and a reception mode of a terminating call. The manual modes are specified by no generation of the tone signal TN while the reception mode, by generation of the tone signal TN. Therefore, the luminous symbol MM is representative of quiescence of the tone signal TN while the luminous symbol VB, an accompaniment of the tone signal TN, namely, vibration. In addition, the luminous symbol AR is indicative of an automatic reset operation as will be described later while the luminous arrow symbol is indicative of presence of the following message.

Referring to FIG. 6 again together with FIG. 7, it will be assumed that the second enable signal $S_2$ is produced in the first intermediate mode by closure of the second manual switch 62. As readily understood from FIG. 6, the message processor 75 is put into the readout display mode so as to display a specific one of the messages on the liquid crystal display member 85 (FIG. 7). Thus, the readout display mode is specified by a succession of production of the first enable signal $S_1$ and twice production of the second enable signal $S_2$. The succession of the first and the second enable signals $S_1$ and $S_2$ will be referred to as a third one of the mode signals.

Let the filed messages be equal in number to eight. Each message is divisible into a plurality of character sequences, namely, parts consecutive from the leading one of the parts to the trailing one thereof. Each part occupies the memory areas of the random access memory 76, as described in conjunction with FIG. 5.

It takes a long time to search for the specific message from the filed messages when the filed messages are great deal in number and long. In order to rapidly access or read the specific message, only the leading part of each filed message is successively displayed on the liquid crystal display member 85 in the readout display mode.

In the above-mentioned example, the second enable signal $S_2$ appears in response to a manual operation, namely, closure of the second manual switch 62, which may be called a first manual operation. As a result, each leading part of the filed messages is successively sent from the random access memory 76 to the liquid crystal display member 85 in response to the second enable signal $S_2$ supplied during the first intermediate mode (FIG. 6), as exemplified in FIG. 7(B). In FIG. 7(B), the symbols $M_2$, AR, and the arrow are luminous on the indicator member 86. This means that the illustrated leading part "MR JOHN!HURRY" is of a second one of the filed messages and automatically reset to be followed by a third one of the filed messages. Such a successive display mode of each leading part of the filed messages will be named a first specific mode started by the first manual operation.

Let the second filed message be the specific one searched by the possessor. In this case, the first manual switch 51 is operated or closed by the possessor to produce the first enable signal $S_1$ while the second filed message is being displayed on the liquid crystal display member 85. The manual operation of the first manual switch 51 will be called a second manual operation and puts the message processor 32 into a second specific mode. In the second specific mode, the remaining parts of the specific message are successively displayed on the display unit 71.

In FIGS. 6 and 7, it will now be assumed that the message processor 32 is put into the second intermediate mode (FIG. 6) for announcing the file access operation and that the second manual switch 62 is operated as the first manual operation to produce the second enable signal $S_2$. Consequently, the second intermediate mode is shifted to the preservation mode. Thus, the preservation mode is specified by a combination of the first, third, and second enable signals $S_1$, $S_3$, and $S_2$ which may be called one of the mode signals.

In the preservation mode, each leading part of the filed messages is successively read out of the random access memory 76 and displayed on the liquid crystal display member 85 in the manner described in conjunction with the readout display mode. In addition, the symbol P is luminous on the indicator member 86, as exemplified in FIG. 7(C), so as to specify the preservation mode. If the illustrated message "TODAY'S SCHEDULE" is to be preserved, the first manual switch 51 is operated as the second manual operation. As a result, the illustrated message is preserved without being erased from the random access memory 76.

Each final mode, such as the readout display mode and the preservation mode, is divided into a plurality of specific modes so as to rapidly access the specific message.

With the illustrated message processor 32, it is possible to return each final mode back to the selection mode (FIG. 6) by closing the first manual switch 51 after lapse of the predetermined duration (5 seconds).

When the message processor 32 is put into the selection mode, a following one of the final modes can be specified by the use of the manual switches 51 and 62 to 64 in the above-mentioned manner. For example, the memory backup mode is selected by closing the fourth manual switch 64 two times, as will readily be understood from FIG. 6. In the memory backup mode, the central processing unit 75 (FIG. 5) transfers the control signals to the random access memory 76. Therefore, the control signals are kept in the random access memory 76 together with the filed messages even when the battery 81 is removed for a short while. The control signals are sent back to the central processing unit 75 when the source voltage $V_{DD}$ is supplied to the central processing unit 75 again.

Anyway, each of the first through the fourth manual switches 51 and 62 to 64 are operated or closed a plurality of times so as to specify each of the final modes. As a result, a lot of final and intermediate modes can be indicated by the use of a reduced number of manual switches.

Figure 9:
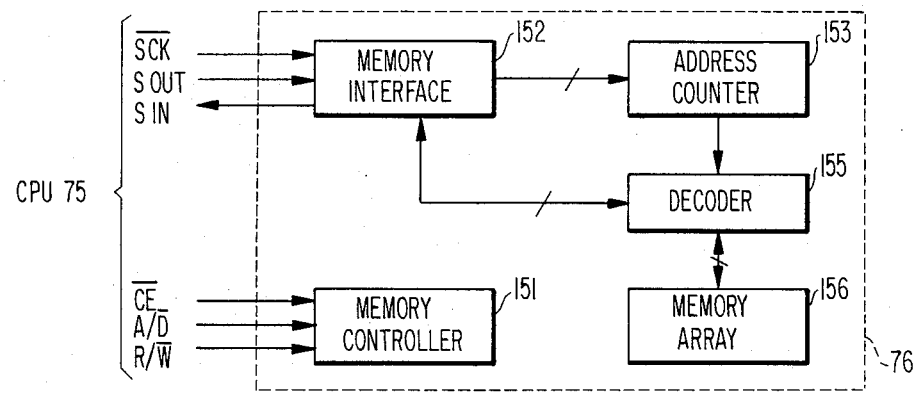
FIG. 9 is a block diagram of a random access memory used in the message processor.
Figure 10:
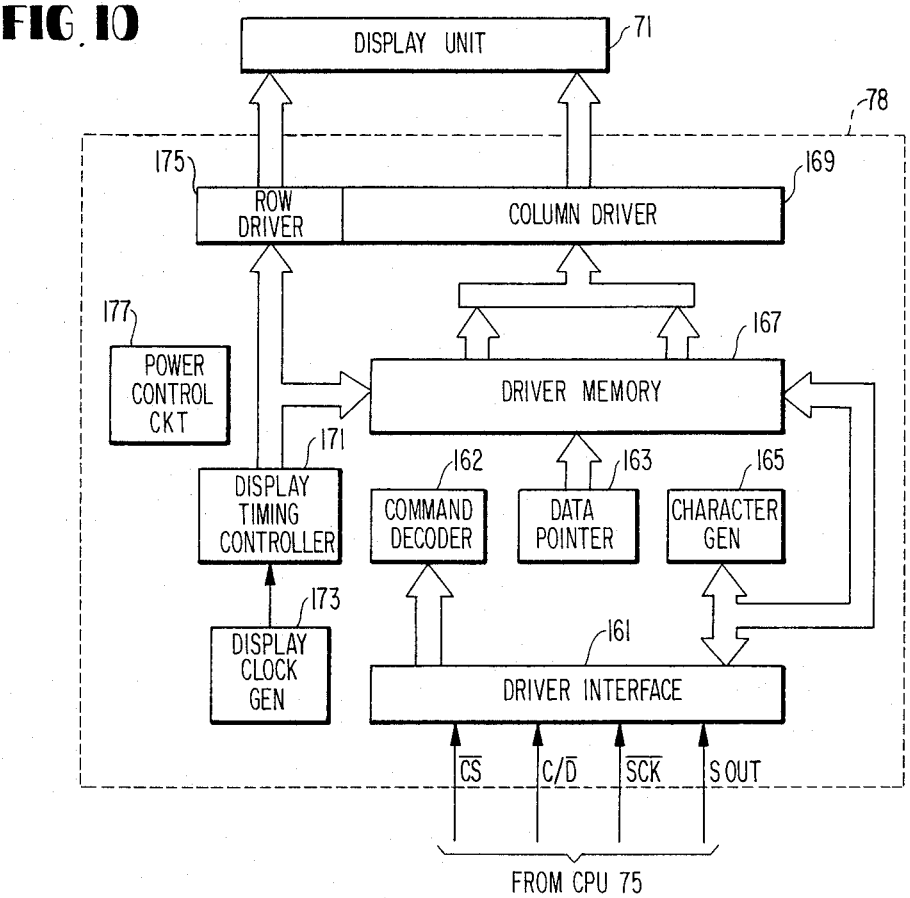
FIG. 10 is a block diagram of a display driver circuit shown in FIG. 5.

Referring to FIGS. 8, 9, and 10 afresh and FIGS. 3 and 5 again, the message processor 32 will be described in detail. In FIGS. 5 and 8, the central processing unit 75 may be of a single semiconductor chip and comprises first through third input ports 101, 102, and 103 and an interruption port 104, which are all coupled to the decoder 31 (FIG. 3). The first through third input ports 101 to 103 are supplied with the first frequency divided pulses FD, the regenerated clock pulses or second clocks CL, and the message pulses MP which are shown in FIG. 3. The interruption port 104 is operable in response to the fourth detection signal $DT_4$ and the first enable signal $S_1$.

The central processing unit 75 is coupled to the decoder 31 through first and second output ports 106 and 107 for delivering first and second output signals ME and AC to the decoder 31, as will become clear as the description proceeds.

Fourth, fifth, and sixth input ports 109, 110, and 111 are coupled to the second, third, and fourth manual switches 62, 63, and 64 operable in response to the second through fourth enable signals $S_2$ to $S_4$, respectively.

The illustrated central processing unit 75 further comprises third, fourth, fifth, sixth, and seventh output ports 113 to 117 connected to a chip enable line $\overline{CE}$, an address/data indication line A/$\overline{D}$, a read/write indication line R/$\overline{W}$, a chip selection line $\overline{CS}$, and a command/data indication line C/$\overline{D}$, respectively. The chip enable line $\overline{CE}$, the address/data indication line A/$\overline{D}$, the read/write indication line R/$\overline{W}$ are coupled to the random access memory 76 (FIGS. 5 and 9). On the other hand, the chip selection line $\overline{CS}$ and the command/data indication line $\overline{CD}$ are coupled to the driver circuit 78 (FIGS. 5 and 10).

A processor interface 119 is coupled through first and second output signal lines SOUT and SCK to both of the random access memory 76 (FIG. 9) and the driver circuit 78 (FIG. 10). The processor interface 119 is also coupled to the random access memory 76 through a signal input line SIN.

The above-mentioned elements, such as the ports and the interface, are coupled to an internal bus 120 laid in the central processing unit 75.

The illustrated central processing unit 75 further comprises a control memory 125, an instruction decoder 127, a program counter 129, an arithmetic and logic unit (ALU) 131, an accumulator (ACC) 133, an internal random access memory 135, and a system clock generator 137, which are all similar to those of a conventional central processing unit.

However, it is to be noted that the illustrated central processing unit 75 is put into operation in cooperation with the first through fourth manual switches 51 and 62 to 64 in the manner described in conjunction with FIGS. 5 and 7. For this purpose, the illustrated control memory 125 includes a first area 141 for storing the announcement signals and a second area 142 for storing a first and a second specific program for accessing the random access memory 76 (FIGS. 5 and 9) to put the central processing unit 75 into the first and the second specific modes described in conjunction with FIG. 7, respectively. In the second area 142, a third specific program is also stored so as to transfer the control signals transiently left in the central processing unit 75 to the random access memory 76 in the memory backup mode.

The remaining elements of the central processor unit 75 except the control memory 125 are operable in relation to the announcement signals read out of the first area and to the first through third specific programs. It may be said that the remaining elements are called an accessing circuit, and first through third program read-out circuits when operated in relation to the announcement signals and to the first through third specific programs, respectively.

Operation of the central processing unit 75 illustrated in FIG. 8 will be described with reference to FIGS. 3, 9, and 10. The central processing unit 75 is enabled when the fourth detection signal $DT_4$ is supplied to the interruption port 104 as a result of detection of the call number signal in the call number signal detector 39 (FIG. 3). In this event, the regenerated clock pulses CL are supplied from the clock regenerator 46 (FIG. 3) to the second input port 102. A connection between the decoder 31 and the central processing unit 75 serves to deliver the regenerated clock pulses CL to the central processing unit 75. The message pulses MP are supplied through the third input port 103 and the internal bus 120 to the accumulator 133 in synchronism with the regenerated clock pulses CL and then stored in the internal random access memory 135. The message pulses MP stored in the internal random access memory 135 are decoded into a decoded message signal of 31 bits by the use of the arithmetic and logic unit 131 under control of a normal program stored in the program memory 125 and executed by the instruction decoder 127. The decoded message signal of 31 bits has an information bit signal of 20 bits and a check bit signal of 10 bits, as mentioned in conjunction with FIG. 2.

The information bit signal is memorized in the random access memory 76 (FIGS. 5 and 9). More particularly, the random access memory 76 is put into an enabled state by rendering the chip enable line $\overline{CE}$ into a logic "0" level. The logic "0" level on the chip enable line $\overline{CE}$ may be called a chip enable signal. An address of the random access memory 76 should be specified so as to store the information bit signal. To this end, an address signal which specifies the address to be stored is sent through the processor interface 119 and the first output line SOUT to the random access memory 76 in a serial fashion. Simultaneously, a sequence of system clocks produced by the system clock generator 137 is delivered through the processor interface 119 and the second output signal line $\overline{SCK}$ to the random access memory 76. At this time, the address/data indication line A/$\overline{D}$ is supplied with a logic "1" level as an address indication signal.

In FIG. 9, the chip enable line $\overline{CE}$, the address/data indication line A/$\overline{D}$, and the read/write indication line R/$\overline{W}$ are connected to a memory controller 151 of the random access memory 76. The first and the second output signal lines SOUT and $\overline{SCK}$ are connected to a memory interface 152 together with the signal input line SIN.

Responsive to the address indication signal and the chip enable signal, the memory controller 151 judges that the address signal is received through the first output signal line SOUT. In this event, the address signal is delivered through the memory interface 152 and an address counter 153 to an X-Y decoder 155 under control of the memory controller 151. As a result, the address of a memory array 156 is indicated through the decoder 155.

Thereafter, the information bit signal is sent through the processor interface 119 and the first output signal line SOUT to the memory interface 152. Concurrently, both of the address/data indication line A/$\overline{D}$ and the read/write indication line R/$\overline{W}$ are given the logic "0" levels as a data indication signal and a write indication signal, respectively. Thus, the information bit signal is sent through the X-Y decoder 155 to the memory array 156 and memorized in the indicated address.

The message pulses MP are successively processed and stored in the above-mentioned manner. When no reception of any message signals is detected by the central processing unit 75, the first output signal ME is sent through the first output port 106 to the decoder 31 (FIG. 3). Detection of no reception of any message signals is possible by detecting appearance of a prescribed pattern representative of a termination of the message signals and/or by detecting absence of two consecutive words.

Each message is represented by a succession of the information bit signals in the above-mentioned manner.

Responsive to the first output signal ME, the clock regenerator 46 (FIG. 3) of the decoder 31 interrupts the regenerated clock pulses CL. The decoder 31 also interrupts the regenerated clock pulses CL in response to the third detection signal DT$_3$ representative of detection of the end signal E.

The interruption of the regenerated clock pulses CL brings about interruption of processing the message pulses MP. Concurrently, the second output signal AC is delivered through the second output port 107 to the tone generating circuit 52 (FIG. 3). Supplied with the second output signal AC, the tone generating circuit 52 is energized to send the tone signal TN to the loudspeaker 54 (FIG. 1) through the buffer circuit 56. The tone signal TN lasts a preselected duration of, for example, 8 seconds. In other words, the tone generating circuit 52 is energized the preselected duration by the second output signal AC. The preselected duration is controlled in the central processing unit 75 with reference to the first frequency divided pulses FD having the frequency of 2 KHz. Thus, the first frequency divided pulses FD are used as a timing signal in the central processing unit 75.

The loudspeaker 54 is driven by the tone signal TN to audibly produce a tone the preselected duration. Let the first manual switch 51 be operated or closed by the possessor during production of the tone. In this event, the first enable signal S$_1$ is sent from the driver circuit 49 (FIG. 3) to the interruption port 104. Supplied with the first enable signal S$_1$ during production of the tone, the central processing unit 75 forcibly stops the second output signal AC before lapse of the preselected duration. Thus, the tone can be interrupted by closure of the first manual switch 51.

After the information bit signals are successively stored in the random access memory 76 in the above-mentioned manner, the central processing unit 75 controls the display unit 71 through the display driver circuit 78 (FIGS. 5 and 10) so as to visually display each message carried by the message signals M.

At first, a display operation will be described on the assumption that none of the first through the fourth manual switches 51 and 62 to 64 are operated by the possessor. An initial address signal is sent from the processor interface 119 through the first output signal line SOUT to the random access memory 76 to specify an initial one of the addresses assigned to an initial one of the information bit signals.

In this event, the chip enable line $\overline{CE}$ and the chip selection line $\overline{CS}$ are supplied from the central processing unit 75 with the logic "0" levels to energize the random access memory 76 and the display driver circuit 78, respectively. The central processing unit 75 puts the logic "0" level and the logic "1" level on the address-/data indication line A/$\overline{D}$ and the read/write indication line R/$\overline{W}$, respectively. Consequently, the initial information bit signal is read out of the initial address of the memory array 156 at every group of eight bits and is sent to the central processing unit 75 through the X-Y decoder 155, the memory interface 152, and the input signal line SIN. The internal random access memory 135 transiently gives refuge to the readout initial information bit signal. The remaining information bit signals are transferred from the random access memory 76 to the internal random access memory 135 in the above-described manner.

Subsequently, the central processing unit 75 puts the random access memory 76 into a disable state by turning the chip enable line $\overline{CE}$ to the logic "1" level. Simultaneously, the command/data indication line C$\overline{D}$ is supplied with the logic "1" level so as to indicate supply of commands, such as a write-in command, a conversion command, and the like. The conversion command is for converting each information bit signal to the corresponding character. The chip selection line $\overline{CS}$ is kept at the logic "0" level to access the display driver circuit 78. Under the circumstances, the central processing unit 75 supplies the display driver circuit 78 with the commands through the first output signal line SOUT.

Thereafter, each of the information bit signals is sent from the internal random access memory 135 to the display driver circuit 78 through the first output signal line SOUT. In this case, the command/data line C$\overline{D}$ is kept at the logic "0" level.

In FIG. 10, the display driver circuit 78 comprises a driver interface 161 connected to the chip selection line $\overline{CS}$, the command/data indication line C/$\overline{D}$, and the first and the second output signal lines SOUT and $\overline{SCK}$.

Each command is specified by the logic "1" level appearing on the command/data indication line $\overline{CD}$ and is delivered from the driver interface 161 to a command decoder 162. The command decoder 162 delivers driver control signals to elements of the display driver circuit 78 determined by each command. When the command given to the display driver circuit 78 is either the write-in command or the conversion command, a data pointer 163 is driven by the command decoder 162 to specify a memory address in a usual manner. The command/data indication line $\overline{CD}$ is supplied with the logic "0" level after the data pointer 163 is driven.

Under the circumstances, the information bit signal is delivered through the driver interface 161 to a character generator 165. The information bit signal is converted by the character generator 165 into the corresponding character signal. The character signal may be representative of a pattern of seven-by-five dots and is stored in the memory address of a driver address 167 which is specified by the data pointer 163.

The driver memory 167 is coupled to a column driver 169 and to a display timing controller 171 driven by a display clock generator 173. The display clock generator 173 is also used to deliver system clocks to various parts of the display driver circuit 78. The display timing controller 171 is coupled to a row driver 175. The column and the row drivers 169 and 175 are coupled to the display unit 71 to provide visual displays. A power control circuit 177 supplies a display voltage to the parts of the display driver circuit 78.

Each character signal is successively read out of the driver memory 167 under control of the display timing controller 171 and is displayed as each message on the display unit 71. It is possible to cyclically display characters at every one of memory zones of the driver memory 167.

Now, operations of the central processing unit 75 will be described in relation to the first through fourth manual switches 51 and 62 to 64. It is assumed that a plurality of messages are stored in the random access memory 76 in the form of the information bit signals and that the first manual switch 51 is closed by the possessor when the tone is not produced by the loudspeaker 54. The first enable signal $S_1$ is supplied from the first manual switch 51 to the interruption port 104. In this event, the announcement signals are read out of the first area 141 under control of the instruction decoder 127 and sent to the display unit 71 as active signals. The display unit 71 displays the operation announcements in response to the active signals, as described before. The announcement signals are also read out of the first area 141 when the second through fourth enable signals $S_2$ to $S_4$ are supplied to the fourth through sixth input ports 109 to 111.

The first and the second specific programs are read out of the second area 142 to be executed under control of the instruction decoder 127 when the first and the second specific modes are indicated by closure of the first through fourth manual switches 51 and 62 to 64, as mentioned in conjunction with FIGS. 5 to 7. Similarly, the third specific program is read out of the second area 142 to be executed in the above-mentioned manner.

In FIGS. 7 and 8, the indicator member 86 (FIG. 7) is controlled by illumination control signals for the respective symbols, such as P, $M_1$ to $M_8$. The programmable read-only memory 40 (FIG. 1) has an area for memorizing the illumination control signals. The illumination control signals are transferred from the programmable read-only memory 40 to the internal random access memory 135 (FIG. 8) through the third input port 103 in a manner similar to the message pulses MP.

Thereafter, the illumination control signals are sent from the internal random access memory 135 to the driver memory 167 (FIG. 10) through the first output signal line SOUT and are read out of the driver memory 167 to illuminate the indicators of the indicator member 86 in the manner illustrated in FIG. 7.

While this invention has thus far been described in conjunction with a preferred embodiment thereof, it will readily be possible for those skilled in the art to put this invention into practice in various other manners. For example, it is possible to provide a wide variety of other modes, such as a manual control mode, automatic control modes, and the like. The manual control and the automatic control modes may be selected in the scroll operation mode by closing the second and the fourth manual switches, so as to control the scroll operation.

What is claimed is:

1. A paper receiver operable in response to a message signal transmitted from a transmitting station, said paper receiver having a plurality of operational functions, each function being different from the other of said functions and comprising a storage element for storage each message carried by message signals transmitted from a transmitting station and a display unit for displaying each message stored in said storage element, said pager receiver further comprising:

mode specifying means for specifying a first plurality of manual modes, each said mode being indicative of at least one of said operational functions by manual operation thereof into a second plurality of positions, one after another at a time, to produce a unique mode signal, each such signal being indicative of each of said manual modes, said second plurality of positions being smaller in number than said first plurality of manual modes;

a memory unit for memorizing a third plurality of announcement signals representative of operation announcements, respectively, said operation announcements corresponding to the respective manual modes, each of said operation announcements being indicative of at least one of said manual modes that may be specified following the manual mode indicated by said mode signal; and accessing means coupled to said specifying means and to said display unit for accessing said memory unit in response to said mode signal to send one of said announcement signals to said display unit as an active signal and to make said display unit display the operation announcement represented by said active signal.

2. A pager receiver as claimed claim 1, wherein said mode specifying means comprises:

a manual operable switch responsive to a first one of said manual operations for producing a first one of said mode signals representative of a first one of said manual modes and further responsive to a second one of said manual operations following said first manual operation for producing a second one of said mode signals that is representative of a second on of said manual modes different from said first manual mode.

3. A pager receiver as claimed in claim 1, each of said message signals being divisible into a plurality of parts arranged from a leading part to a trailing one, said pager receiver comprising storage element for storing said parts of each message signal, wherein said mode specifying means comprises:

first means for producing a first specific one of said mode signals that specifies a first specific one of said manual modes when said first means is manually operated; and second means for producing a second specific one of said mode signals that specifies a second specific one of said manual modes when said second means is manually operated;

said pager receiver further comprising:

first readout means responsive to said first specific mode signal and coupled to said storage means for successively reading each leading part of said message signals out of said storage means to make said display unit successively display said each leading part; and second readout means responsive to said second specific mode signal and coupled to said first readout means for reading the remaining parts of the message of which the leading part is being displayed on said display unit.

4. A pager receiver as claimed in claim 3, said pager receiver comprising a storage power source detachable from said storage means for delivering a source voltage to said storage means when said storage power source is connected to said storage means, said pager receiver further comprising:

capacitor means connected to said power source and said storage means for supplying an electric voltage to said storage means when said storage power source is detached from said storage means.

5. A pager receiver as claimed in claim 1, said pager receiver being operable in response to a call signal comprising a call number signal assigned to said pager receiver and a message signal which follows said call number signal and carries each of said messages, said receiver further comprising:

clock generating means for generating a sequence of oscillation pulses having a predetermined oscillation frequency;

clock pulse producing means responsive to said oscillation pulses for producing a first and a second sequence of clock pulses which have a first predetermined frequency and a second predetermined frequency different from said first predetermined frequency, respectively, said first and said second predetermined frequencies being lower than said predetermined oscillation frequency;

detection means responsive to said first clock pulses and said call signal for detecting said call number signal; and delivering means for delivering said second clock pulses to said access means to put said accessing means into operation in accordance with said second clock pulses.

6. A pager receiver operable in response to a message signal transmitted from a transmitting station, said pager receiver having a plurality of operational functions, each function being different from the other of said functions and comprising a memory unit storing each message signal which is representative of a message and which is divisible into a plurality of parts arranged from a leading part to a trailing part and a display unit for displaying said message, said each message signal being transmitted from a transmitting station, wherein the improvement comprises:

mode specifying means energized by each of a plurality of manual operations for specifying a first plurality of manual modes, each said mode being indicative of at least one of said operational functions, said mode specifying means specifying a first specific mode in response to a first one of said manual operations to produce a first specific mode signal representative of said first specific mode and for specifying a second specific mode in response to a second one of said manual operations following said first manual operation to produce a second specific mode signal representative of said second specific mode, said mode specifying means being used in common to specify said first and said second specific modes;

in one of said operational functions, said first readout means being responsive to said first specific mode signal for successively reading each leading part of said messages out of said memory means to make said display unit successively display said each leading part; and in said one operational function, second readout means responsive to said second specific mode signal and coupled to said first readout means for reading the remaining parts of the message of which the leading part is being displayed on said display unit.

* * * * *

UNITED STATES PATENT AND TRADEMARK OFFICE
CERTIFICATE OF CORRECTION

PATENT NO. : 4,857,911
DATED : August 15, 1989
INVENTOR(S) : Mori et al

It is certified that error appears in the above-identified patent and that said Letters Patent is hereby corrected as shown below:

Column 2, line 16, delete "lock" and insert --block--

Column 7, line 19, delete "t,0180"

Column 7, line 19, insert "Table 1" as shown on Page 16, line 9 of the specification.

Column 14, line 63, delete "on" and insert --one--.

Signed and Sealed this

Twenty-fourth Day of September, 1991

Attest:

HARRY F. MANBECK, JR.

Attesting Officer

Commissioner of Patents and Trademarks